April 27, 1965　　　F. D. MARASSO　　　3,180,522
PAN LOADING DEVICE
Original Filed May 21, 1956　　　9 Sheets-Sheet 1

INVENTOR.
FRED D. MARASSO
BY Bradley Cohn
ATTORNEY

April 27, 1965   F. D. MARASSO   3,180,522
PAN LOADING DEVICE

Original Filed May 21, 1956                    9 Sheets-Sheet 2

INVENTOR.
FRED D. MARASSO
BY
ATTORNEY

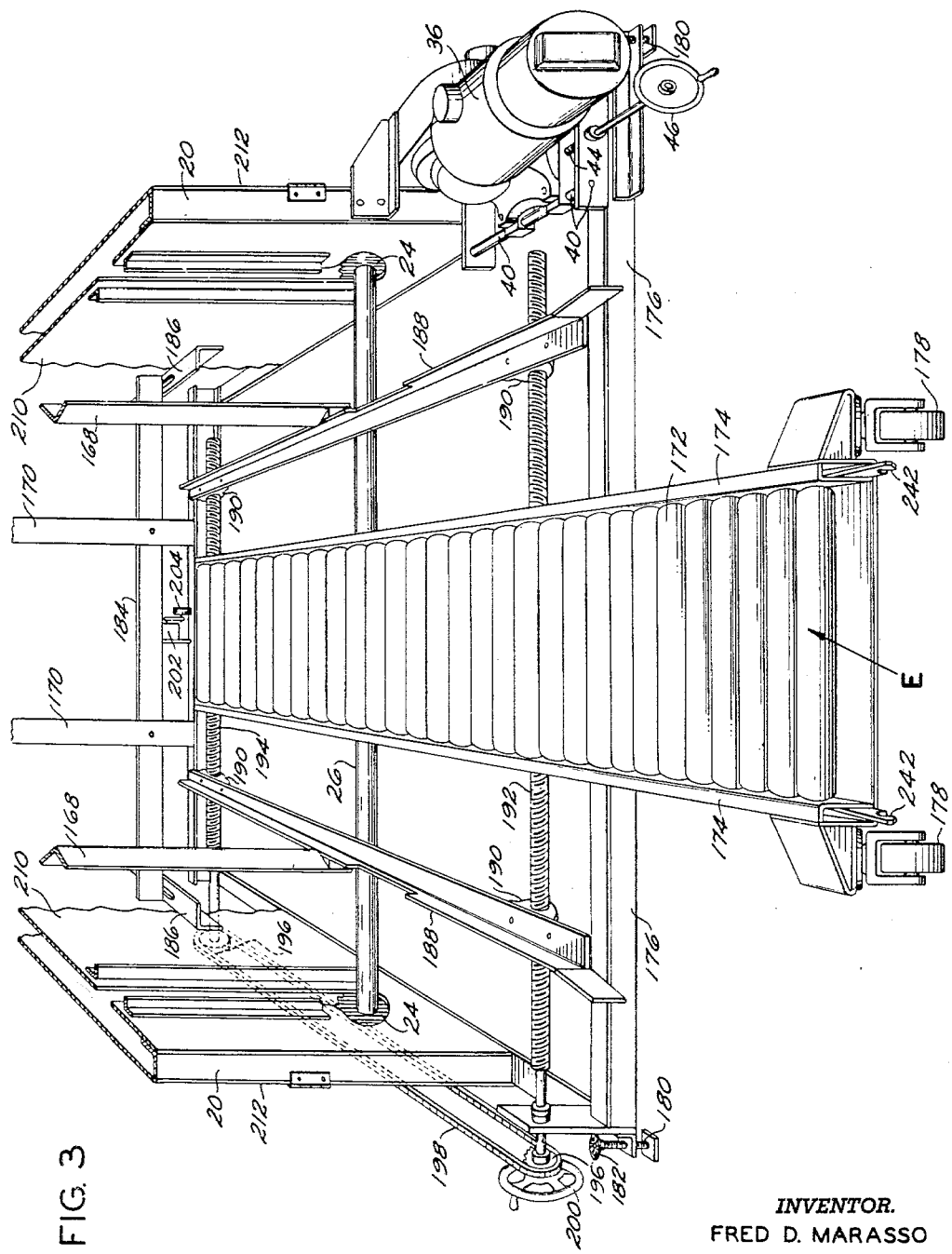

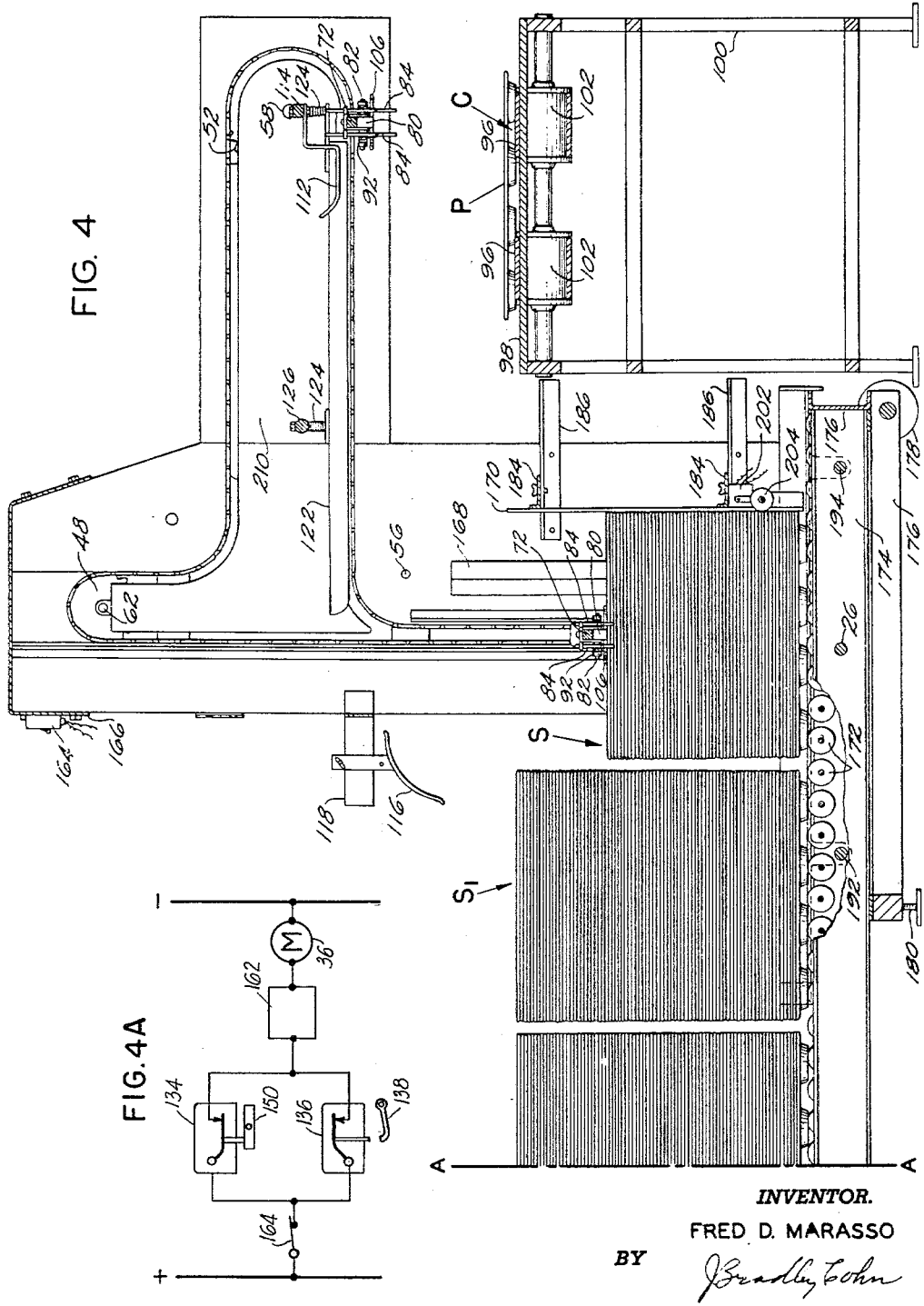

April 27, 1965 F. D. MARASSO 3,180,522
PAN LOADING DEVICE
Original Filed May 21, 1956 9 Sheets-Sheet 5
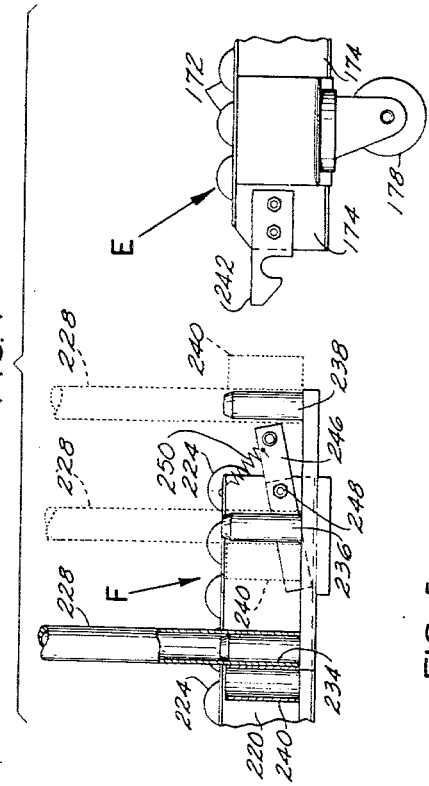
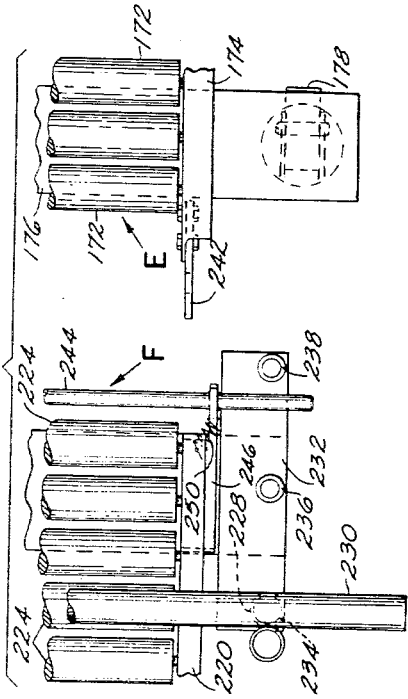
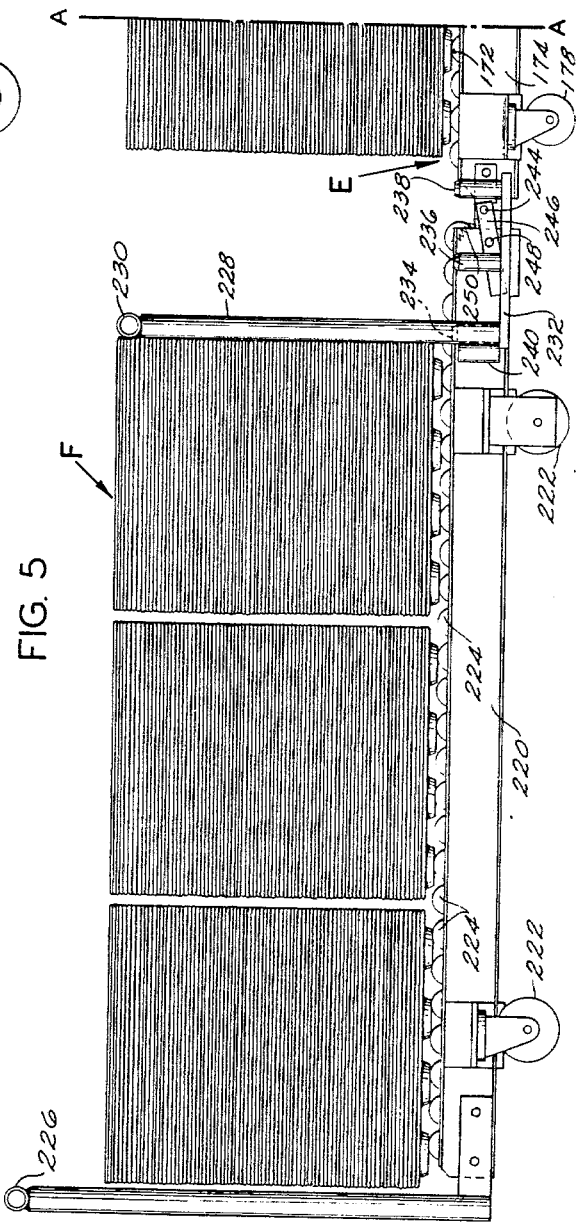
INVENTOR.
FRED D. MARASSO
BY
ATTORNEY

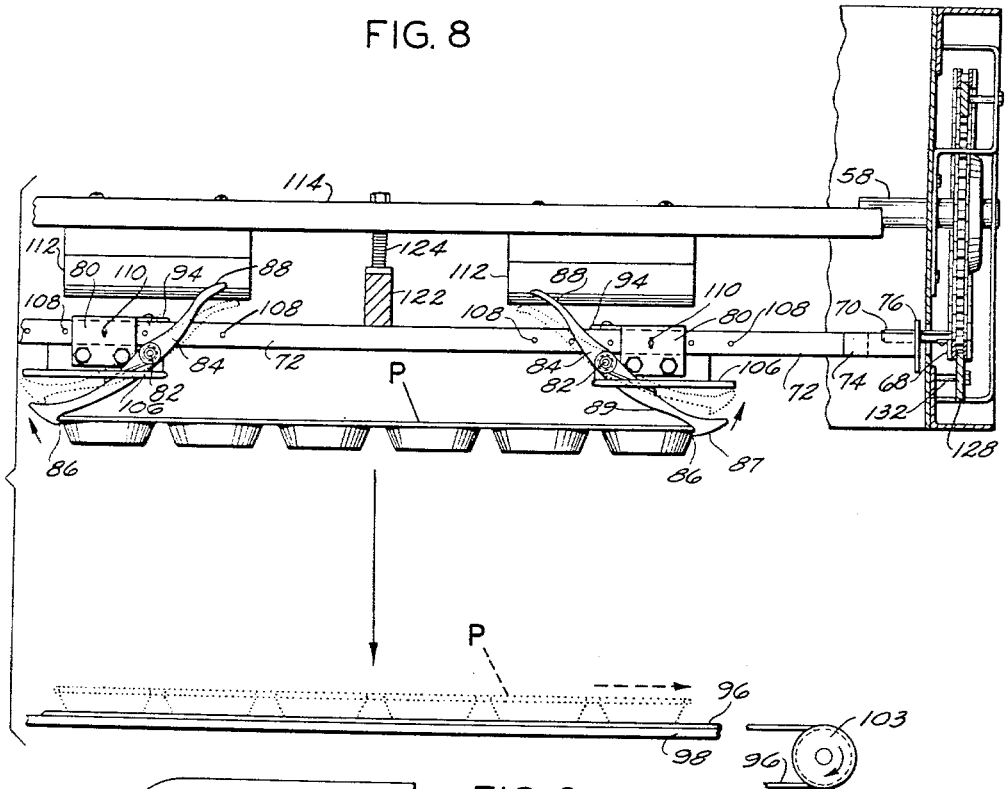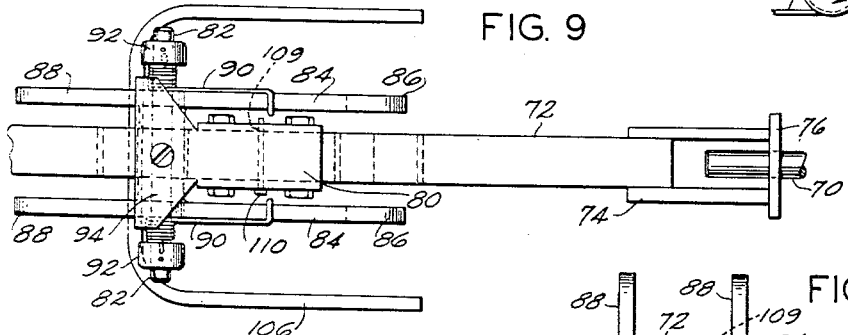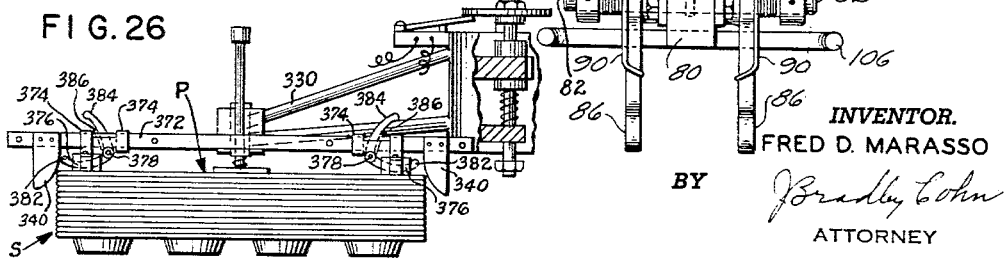

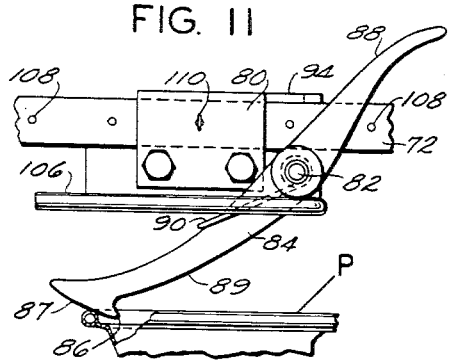
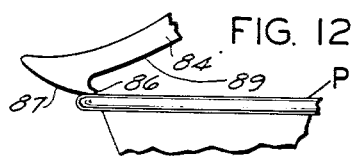
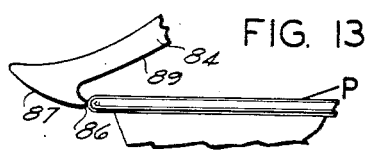
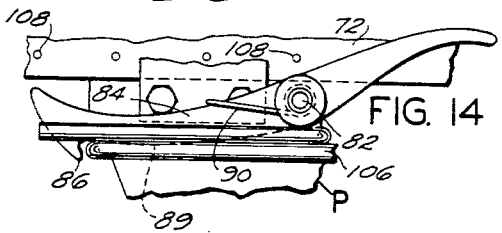
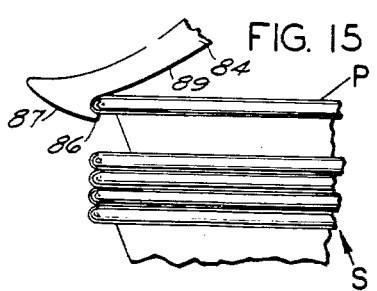
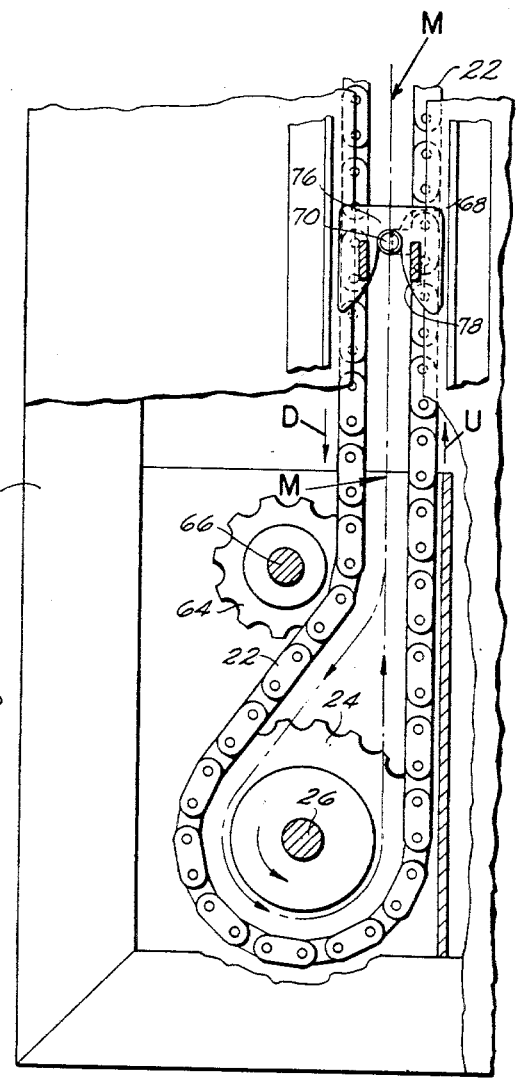

April 27, 1965 F. D. MARASSO 3,180,522
PAN LOADING DEVICE
Original Filed May 21, 1956 9 Sheets-Sheet 8

INVENTOR.
FRED D. MARASSO
BY
ATTORNEY

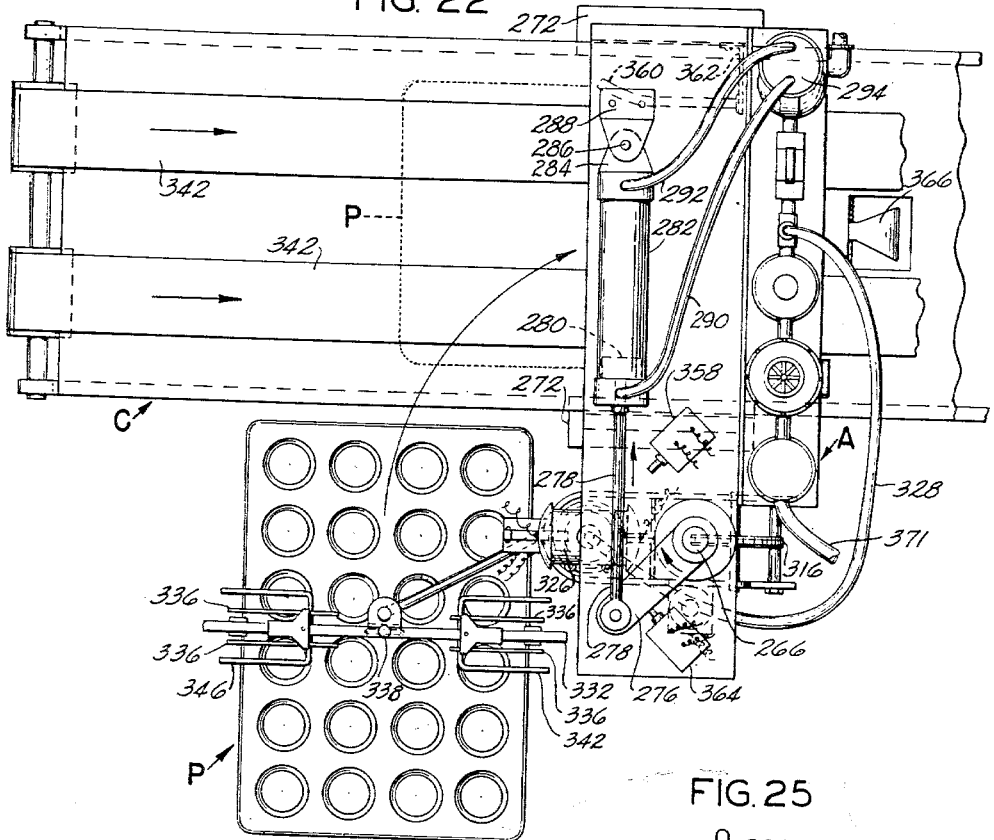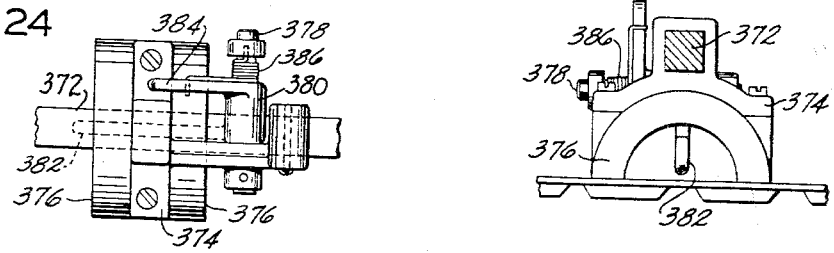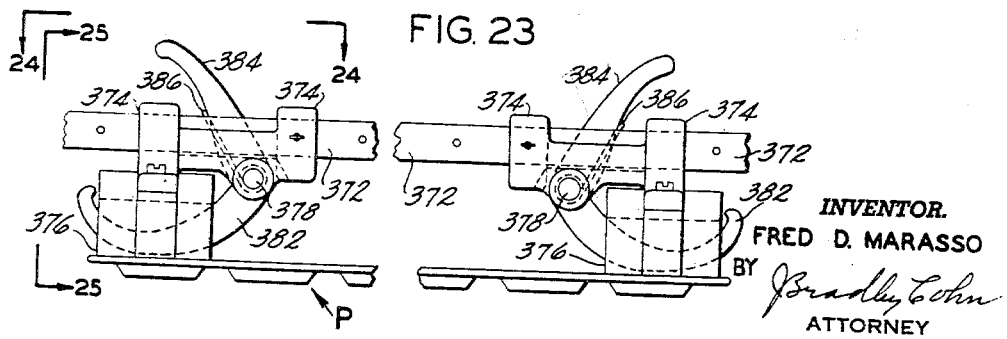

3,180,522
PAN LOADING DEVICE
Fred D. Marasso, Richmond, Va., assignor, by mesne assignments, to American Machine & Foundry Company, New York, N.Y., a corporation of New Jersey
Original application May 21, 1956, Ser. No. 586,083, now Patent No. 3,058,614, dated Nov. 16, 1962. Divided and this application Feb. 20, 1962, Ser. No. 174,592
6 Claims. (Cl. 221—106)

This application is a division of application Serial No. 586,083 filed by me on May 21, 1956 for a Pan Loading Device, now Patent 3,058,614, granted November 16, 1962.

This invention relates to loading objects one by one onto a conveyor and more particularly relates to a device whereon objects may be stacked adjacent the conveyor and loaded from the stack onto the conveyor one by one.

A particular object of the invention is to provide a means for automatically removing pans from a stack of pans and depositing them one by one on the pan conveyor of a bakery panning machine.

In the bakery industry machines have been provided whereon pans are placed in seriatim on a conveyor and conveyed forward to a panning station where the pans are filled, as for example with a bakery dough. These pans are brought to the machine in nested or stacked arrangement. Heretofore it has been necessary to hand-load them onto the pan conveyor. Pans in such a nested stack are difficult to separate since they fit into each other in very close contact. It is therefore an object of this invention to separate pans from said stack one by one in order that they may be transferred to the conveyor.

In a bakery, pans of varying size are used depending on the type of goods to be baked. Accordingly, any automatic equipment must be adaptable to handle various sized pans. It is therefore an object of the invention to devise a storage and loading device capable of handling pans of various sizes.

It is also an object of this invention to provide timing means so that the pans may be loaded promptly and in rapid succession if required and also in the event of momentary slowdown of the conveyor, the loading must be halted automatically so that one pan is not deposited on top of the preceding pan.

A further object of this invention is to devise a pan loading device capable of storing a large quantity of pans for ready movement to the transfer station from which they are loaded onto the conveyor.

It is still another object of the invention to provide a detachable section of the storage compartment which may be loaded at a distance from the machine and brought to the machine.

Still another object of the invention is to provide signal means that will alert an operator when the supply or reservoir of pans is low.

It is a further object of the invention to devise a readily adjustable but durable guide means to accommodate to varying sizes of pans.

It is still another object of the invention to provide such a machine that is of simple and inexpensive construction.

It is still another object of the invention to design novel pan gripping means that will lift one pan from the top of a stack.

Still another object is to provide means for following the decreasing height of a stack of pans so that the pan gripping means will automatically grip the first as well as the last pan from a stack.

It is therefore an object of my invention to devise a machine for conveying stacks of pans in a position adjacent a pan conveyor and to automatically transfer said pans from said stacks one by one in seriatim and in properly timed relation to the demands of said conveyor.

In the accompanying drawings:

FIG. 3 is a perspective front view of the infeed conveyor of the automatic pan loader;

FIG. 4A is a circuit diagram of the switcher controlling the automatic pan loader;

Figure 17:
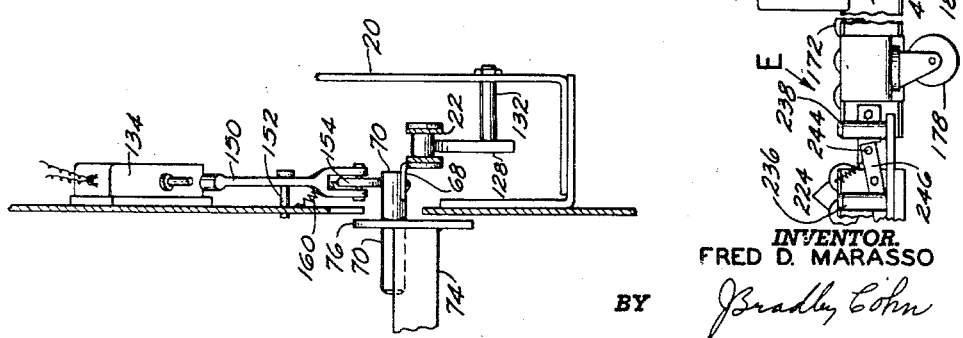
Figure 18:
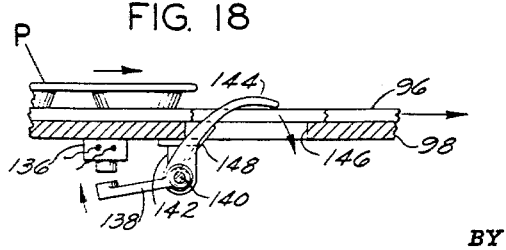
Figure 20:
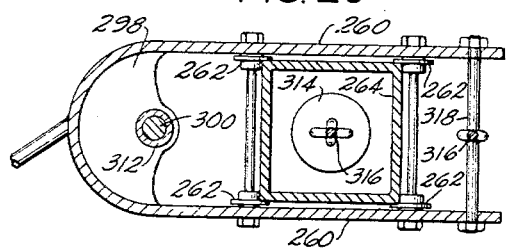
Figure 19:
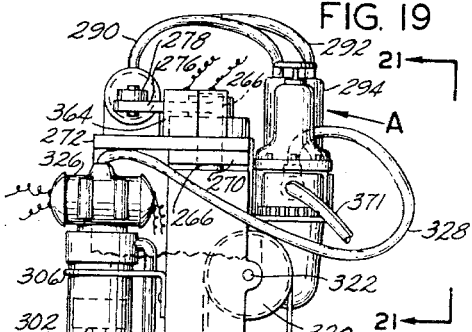
Figure 21:
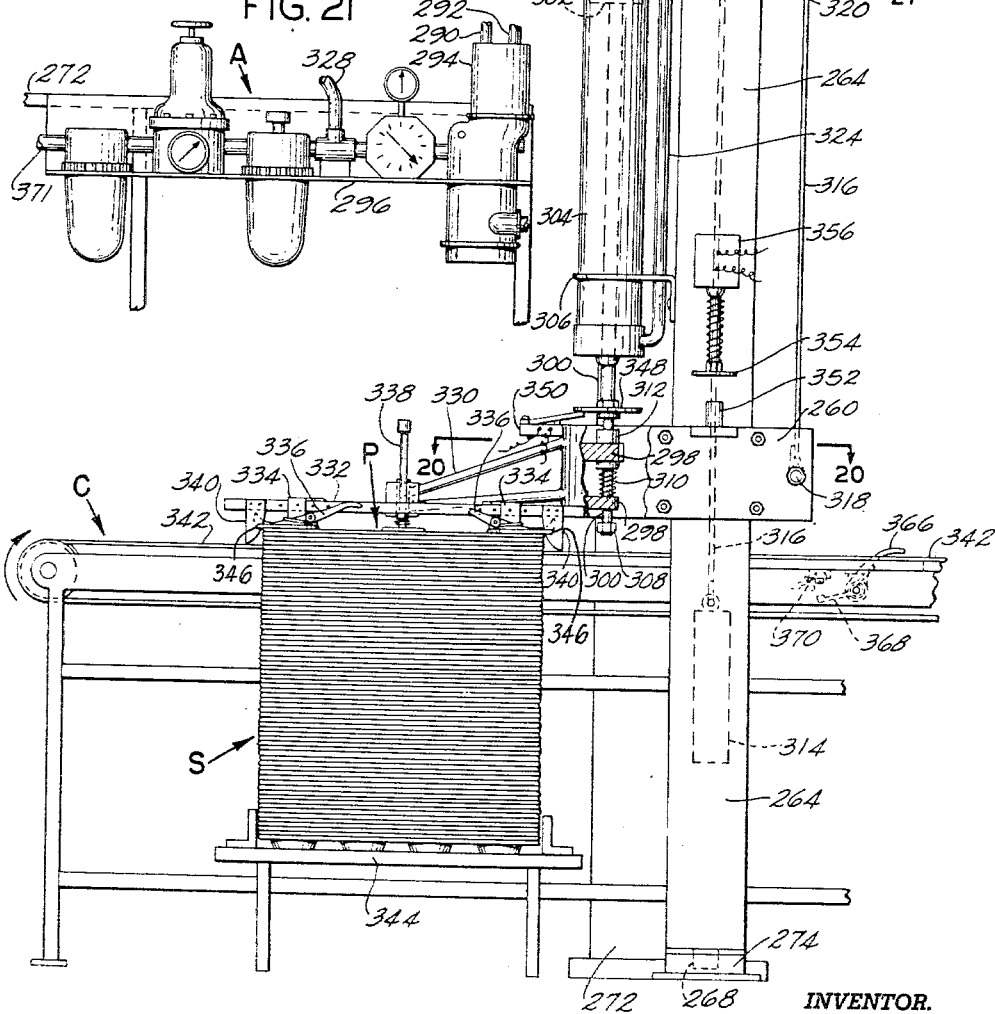

FIGS. 4 and 5 when joined at line A—A represent a sectional side elevation of the entire automatic pan loader showing the movable and detachable storage and infeed conveyor;

FIG. 6 is a partial plan view of a portion of the storage conveyor and the infeed conveyor of the pan loader in detached position illustrating their latching mechanism;

FIG. 7 is a side elevation of FIG. 6 with the portion of the auxiliary conveyor partly in section illustrating the adjustability of the guide posts;

FIG. 8 is a detailed front elevation of the pan gripping, conveying and releasing mechanism;

FIG. 9 is a plan view of a pair of pan gripper fingers;

FIG. 10 is an end elevation of the same;

FIGS. 11, 12, 13, 14 and 15 are front elevations of the pan gripper fingers illustrating the sucessive steps in contacting, gripping and lifting a pan from a stack;

FIG. 16 is a partial side elevation of the pan gripper carrying chain illustrating the novel engaging and disengaging arrangements of the chain with the pan gripping device;

FIG. 17 is a sectional end elevation illustrating the pan feed control mechanism;

FIG. 18 is a partial sectional side elevation of a portion of the delivery conveyor, illustrating the pan delivery control mechanism;

FIG. 19 is a front elevation of a modified pneumatically operated pan loader employing gripping fingers;

FIG. 20 is a plan view, partly in section, illustrating the pan carrying arm, taken on line 20—20 of FIG. 19;

FIG. 21 is a side elevation of the pneumatic control instruments, taken on line 21—21 of FIG. 19;

FIG. 22 is a plan view of the modified pneumatic pan loader;

FIG. 23 is a front view of a modified magnetic pan gripper arrangement;

FIG. 24 is an end elevation of the same taken on line 24—24 of FIG. 23;

FIG. 25 is a detailed plan view of one of the magnetic grippers, taken on line 25—25 of FIG. 23;

FIG. 26 is a front elevation of a modification of a portion of FIG. 19 employing magnets instead of finger grippers.

With reference to the drawings, the automatic pan loader consists of a pair of suitably shaped spaced frames 20 within each of which is housed an endless conveyor chain 22 each of which is driven by a sprocket 24. Both sprockets 24 are mounted on a transverse horizontal drive shaft 26. Shaft 26 carries a pulley 28 driven through belt 36 from a Reeves pulley 32 which is similar in its function to that shown in U.S. Patent No 976,596 issued Nov. 27, 1910 to George H. Pertuiset. This pulley 32 is mounted on a shaft 34 projecting from the housing of a suitable gear reduction motor 36 secured to a pair of brackets 38 slidably supported by a pair of rods 40 held by a pair of suitable bearing flanges 42 integral with the frame of the machine. Motor brackets 38 also engage with a threaded spindle 44 rotatably supported in bearing flanges 42. Spindle 44 has a hand wheel 46 for turning spindle 44 to effect a back and forth movement of the gear reduction motor 36 whose supporting bracket 38 engages with said spindle 44. Since pulley 32 is of the Reeves type, this provides a variable speed control for the conveyor chains 22.

The chains 22 are first guided vertically up and over sprockets 48 and 50 and then around sprockets 52 and 54 to form a horizontal loop at right angles to the vertical run.

All sprockets 48, 50, 52 and 54 are rotatably supported, respectively, by short stud shafts 62, 56, 58 and 60 suitably secured in the frames 20. In order to assure that the vertical runs of the chains are exactly parallel, each chain is also led over an additional guide sprocket 64 rotatably supported by a stud shaft 66, each held by the respective frame 20.

Each chain 22 is provided with two angle brackets 68 (FIGS. 8, 16 and 17) secured thereto and spaced half the length of the chain apart. Each bracket 68 carries a pin or stud 70 projecting horizontally towards the center of the machine and opposite the stud 70 of the other chain to form a pair to support horizontally a gripper finger supporting and carrying bar 72. Integral with each end of each gripper finger supporting bar 72 is a carrier bracket 74 the free end of which is provided with a vertical pin engaging plate 76 (FIGS. 8, 9, 16 and 17) having a wedge shaped pin receiving slot 78 by means of which each of the two gripper finger supporting bars 72 are carried by the two pairs of opposed studs 70 on the spaced endless conveyor chains 22.

Each bar 72 supports a pair of slidably mounted gripper finger carrier members 80 (FIGS. 8, 9 and 10) which support a stationary mounted horizontal shaft 82 projecting from each side of said member 80. To each projection of shaft 82 is pivotally mounted a pan gripper finger 84 each of which in a sense is a double lever of which the bottom end is formed as a pan gripping hook 86 while the curved top end portion 88 serves as a disengaging means. Each gripper finger is provided with torsion spring 90 one end of which contacts the top edge of the lower portion of the gripper finger while the other end is secured to a suitable collar 92 mounted to each end of each projection of the stationary shaft 82. The torsion springs 90 have the tendency to urge the pan gripping hook 86 of the fingers 84 downward in such a manner that the gripping hooks 86 of the two pairs of gripper fingers which oppose each other on a gripper finger supporting bar 72 are urged towards each other to grip and hold a pan between them as illustrated in FIG. 8. A suitably shaped plate 94 extending horizontally from the top portion of each carrier member 80 serves as a stop to limit this spring urged movement.

As mentioned heretofore, it is the object of the automatic pan loader to pick up the pans P one by one from a stack S placed in the machine and carry and deliver them to a suitable conveyor C. The latter may consist of a pair of endless parallel spaced and continuously driven conveyor belts 96 supported by a suitable table 98 of a frame 100 and guided over a pair of pulleys 102. Belts 96 are driven by suitable driving pulleys 103 (FIG. 8) connected to a suitable source of power (not shown).

Figure 2:
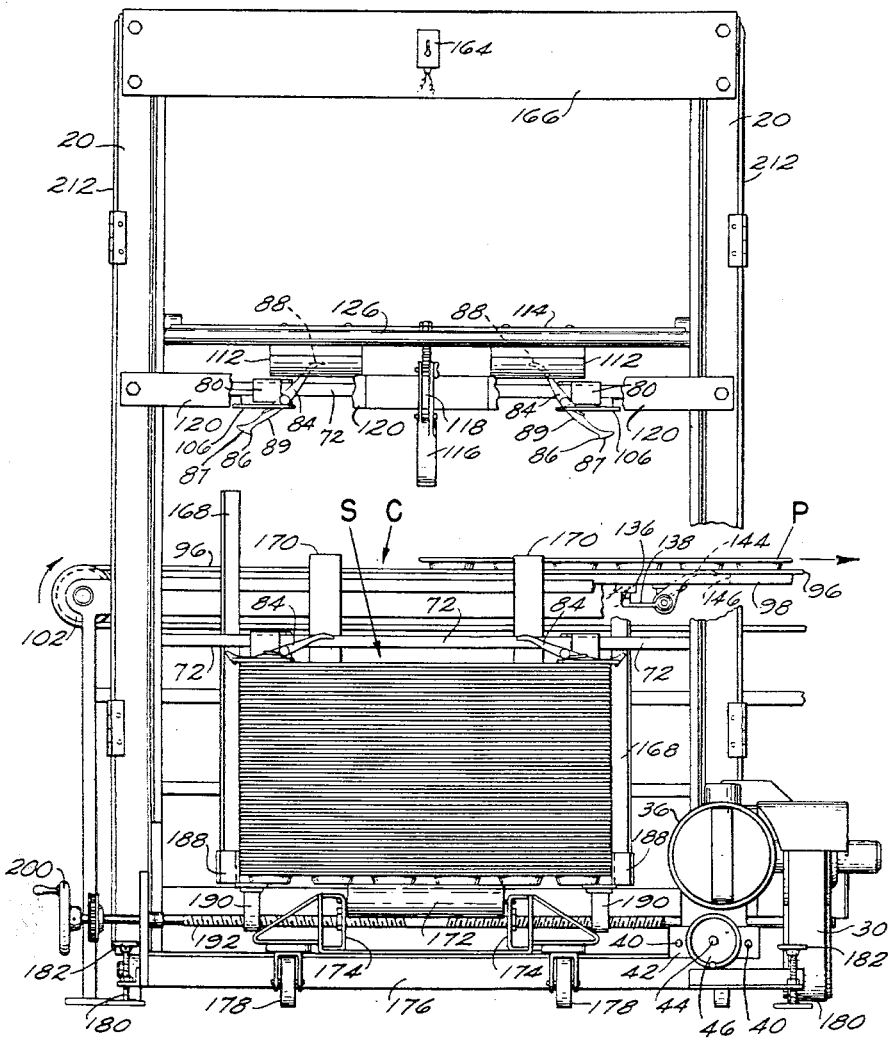
FIG. 2 is a front elevation of the automatic pan loader.

When a pan P is to be picked up from the top of the stack S the gripper finger supporting bar 72, of course, is travelling downward towards said stack and the angle brackets 68 which by means of pins 70 carry said bar 72, are on the vertical downward run of the chain 22 indicated by the arrow D in FIG. 16. When the gripper finger carrying bar 72 reaches the stack it simply comes to rest on top as illustrated in FIG. 2 while the pins 70 of the angle brackets 68 on chain 22 disengage from the slots 78 of the plates 76 as the chain continues its downward movement. After the pin carrying angle brackets 68 on chains 22 travel around the sprocket 24 said brackets, of course, move upward again with the chain in the direction indicated by the arrow U in FIG. 16. When the pins 70 on brackets 68 moving upward with the chain reach the pin gripper supporting bar 72, said pins again engage with the slots 78 of plate 76 and upon continued travel of the chains 22 carry said bar upward. As the gripper finger carrying bar is lifted off the stack of pans, the top pan of said stack is engaged by the gripper fingers and carried upward also. As illustrated in FIG. 16, the distance between the vertical down run D and vertical up run U of the chains is so calculated and arranged that the vertical up or down movement of the pins 70 always move over the same vertical path as indicated by the dot-and-dash lines M (FIG. 16); thus the pins 70 moving with the chains can easily disengage from the plates 76 on their downward movement and readily re-engage on their upward movement regardless of whether the stack of pans is high or low.

The finger carrier members 80 on the supporting bars 72 are so set that when said bar is lowered by the chains 22 onto the stack of pans the lower curved edges 87 of the hook portion 86 of each gripper finger 84 contacts the inner edge of the topmost pan P of the stack first as illustrated in FIG. 11. As bar 72 continues its downward travel said lower edges 87 of fingers 84 slide in a cam like motion over the top edges of said pan as shown in FIG. 12 until the hook portion 86 of fingers 84 slide over the outer edges of the rim of the pan as shown in FIG. 13. The bar 72 continues its downward travel until the two U-shaped stabilizer rods 106, one of each of which is secured to and suspended from each carrier member 80, contacts the rims of the top pan P on the stack and causes the arrest of said bar while the pins 70, which support the bar and are secured through brackets 68 on the chains 22, disengage from said bar and continue their downward movement as described heretofore. In this position the lower side edges 89 of fingers 84 rest on the top edges of the rim of the top pan P as illustrated in FIG. 14 and also in FIG. 2.

The pins 70 move upward again to lift gripper finger supporting bar from the top of the stack S. As the bar is lifted from the rim of the top pan, the torsion springs 90 of the gripper fingers 84 are urged downward, thus causing the lower side edges 89 to remain in contact with the rim of the pan until the hook portion 86 engages with the rim to lift the pan from the stack with the bar 72 as illustrated in FIGS. 15 and 8.

Each bar 72 supports two sets of fingers so that they are able to engage with the rim portions on the opposite ends of each pan as illustrated in FIG. 8. In order to provide means to accommodate pans of different lengths each carrier member 80 is provided with a suitable hole 109 while each bar is provided with a plurality of holes 108. By placing the carrier members in the appropriate position and locking same by means of inserting a pin 110 through the hole 109 in the carrier 80 and the selected hole 108 in the bar 72 various desirable distances between the opposed pairs of fingers on each bar may be obtained. It may also be pointed out that the hook 86 is shaped so that the engagement and sliding action of the lower hook edges 87 of the fingers 89 over the top edges of the rim of the pan during the lowering of the bar onto the pan keep the pan engaging hook fairly sharp and efficient.

After being lifted from the top of the stack S, the pan P is carried upward in a vertical direction which, after the pin supporting brackets 68 on chain 22 have passed around the sprocket 50, changes to a horizontal direction towards the conveyor C. As the pan P reaches a position approximately above the conveyor belts 96 the upward projecting ends 88 of the gripper fingers 84 pass beneath and contact a pair of suitably curved release actuating plates 112 (FIGS. 2, 4 and 8) causing a depressing of fingers 94 as illustrated in dotted lines in FIG. 8 to disengage the hook portions 86 from the rim of the pan P which then, of course, drops onto the moving conveyor belts 96 as shown in dotted lines in FIG. 8 which carry the pan away to an appropriate station for any desired purpose. The release actuating plates 112 are secured to a stationary horizontal cross bar 114 (FIGS. 4 and 8) which at its end is mounted on and supported by the studs 58 which also support the sprockets 52.

In order to prevent excessive whipping of the pan P as the chains, when travelling around sprockets 50, change the path of said pan from a vertical to a horizontal direction, a curved guide bar 116 is provided (FIGS. 2 and 4). This bar 116 is adjustably clamped to a bracket 118 which may be integral and project from a cross bar 120 secured at each end to the front face of each of the two frames 20. While being carried through its horizontal path towards the conveyor C the pan is prevented from swaying or swinging by means of a top guide rail 122 (FIGS. 4 and 8) which is suspended by two suitable spring posts 124 one of which is held by the cross bar 114 while the other is attached to a cross rod 126 held at each end by the frames 20.

In order to prevent sagging of the chains 22 and assure a perfect horizontal path of the pan when carried towards the conveyor C, the chains 22 during their horizontal run are supported by suitable guide rails 128 and 130 (FIGS. 1 and 17) secured by suitable studs 132 to the frames 20.

After the pan P is dropped from the gripper fingers 84 onto the conveyor belts 96 of the conveyor C, said fingers, of course, travel with the chains around the sprockets 52 and 54 and after running over sprocket 48 descend vertically towards the stack S to pick up another pan in the same fashion in an alternate subsequent cycle as described above.

In case same delay occurs in serving one of the leading pans of the row of pans on the conveyor C, timing means are employed to prevent a pan being dropped on the conveyor C before the one previously delivered thereto has moved away. The timing means to automatically obtain such desired delay in pan delivery consist of two normally closed switches 134 and 136. Switch 136 is suitably attached to the underneath side of the table 98 of the conveyor C while the switch 134 is suitably secured within one of the frames 20 (FIGS. 1, 2, 17 and 18).

Figure 1:
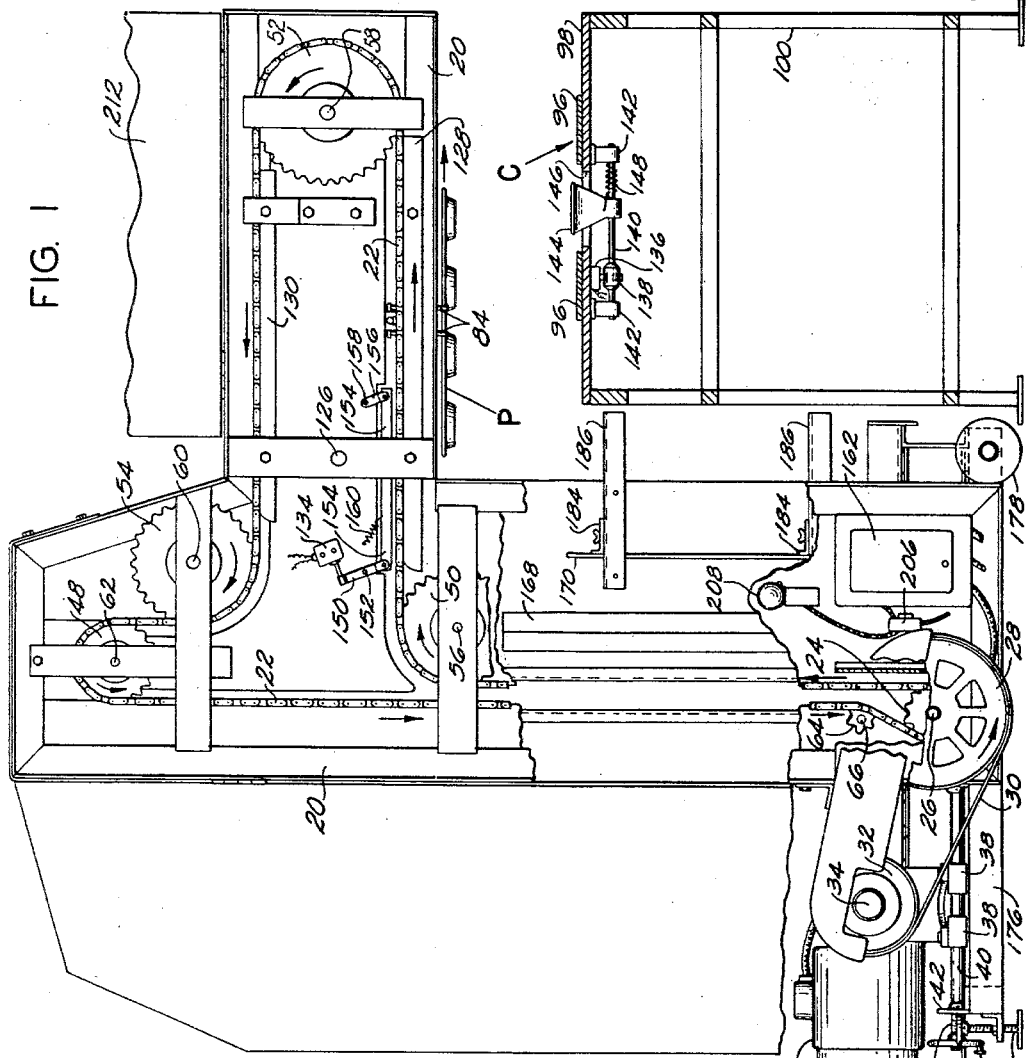
FIG. 1 is a side elevation partly in section of the automatic pan loader illustrated in connection with a pan receiving conveyor.

Switch 136 is activated by means of an arm 138 mounted on a shaft 140 rotatably supported by a pair of bearing brackets 142 fastened to the underside of the conveyor table 98 (FIGS. 1 and 18). To shaft 140 is also secured a feeler finger 144 which with its free end projects through a slot 146 in table 98 between the two conveyor belts 96 into the path of the pan P conveyed by belt 96. One end of a suitable torsion spring 148 bears on the feeler 144 while the other end is anchored to one of the bearing brackets 142 to urge the feeler 144 in the path of the pans with arm 138 away from the contact button of the normally closed switch 136.

The switch 134 is kept normally closed by means of an engagement of its contact button with the upper end of an arm 150 which in its central portion is pivotally mounted on a stud 152 held by and projecting from a frame portion of the machine. To the lower end of arm 150 (FIGS. 1 and 17) is pivotally attached one end of a bar 154 while the other end of said bar is pivotally attached to the free end of a short arm 156 which is loosely supported by a stud 158 so that the bar 154 is suspended horizontally and parallel to chain 22 as illustrated in FIG. 1. In order to keep the free end of arm 150 in engagement with the contact button of the switch 134 to maintain the characteristics of a normally closed switch a tension spring 160 attached to bar 154 and anchored to the framework is provided. The two switches 134 and 136 are connected in parallel to a conventional motor control circuit located in the motor control box 162 attached to one of the frames 20 of the machine.

The timing and control of the pan delivery to the conveyor C operates in the following manner: As mentioned above, a pan P picked from the stack S by the gripper fingers 84 is carried upward first in a vertical direction and then, after passing sprockets 50, in a horizontal direction. The bar 154 in its normal "down" position lies in the path of one of the pins 70 which project from the chains 22 and carry the gripper mechanisms and pan. As the pin 70 contacts the leading rounded edge of the bar 154 it presses the same backward as well as upward until it rides beneath said bar and the latter in somewhat raised position rests on the top of the moving pin as illustrated in FIG. 17. This raising of bar 154 causes the free end of arm 150 to disengage from the contact button of switch 134, thus effecting an opening of the normally closed switch 134. Since the switches 134 and 136 are connected in parallel to the motor control circuit, the closing of either one will energize the motor 36 to drive the pan loader chains 22. Now, if while switch 134 is open, there should be a pan on the conveyor belts 96 riding or stopping over the feeler finger 144 to open switch 136, the motor would stop and thus arrest the pan loader chains 22 in a position beneath bar 154. Thus no pan would be delivered until finger 144 was cleared. The location of bar 154, however, means that a pan is being held ready for prompt delivery when required.

There is also provided on front plate 166 a manual switch 164 for stopping the machine (FIGS. 2 and 4). Switch 164 is in series with switches 134 and 136. The circuit diagram shown in FIG. 4a illustrates how these switches are connected.

The stacks of pans S, $S_1$, FIG. 1, are placed in the machine on a platform E against vertical side and back guides 168 and 170 respectively. The platform E itself consists of a row of parallel mounted rollers 172 which are rotatably supported by means of a pair of spaced parallel rails 174 which are integral with and form a part of the bottom frame 176 of the machine. The vertical side frames 20 are also secured to the bottom frame 176 so that it forms the support for the entire machine.

To facilitate the moving of the pan loader to a machine or conveyor where its services are needed, the bottom frame 176 is provided with a number of suitable casters or rollers 178. To prevent accidental movement of the pan loader after it is placed adjacent a machine or conveyor the bottom frame is also provided with a pair of spindle jacks 180 which may be manipulated by the operator by means of suitable handwheels 182 to effect a positive stationary placement of the pan loader.

The vertical back guides 170 are mounted on a pair of cross members 184 (FIGS. 1, 3 and 4) which are adjustably secured to suitable supporting brackets 186 fastened to the vertical side frames 20 of the machine. Each of the vertical side guides 168 is at its bottom end secured to a bottom guide rail 188 (FIGS. 2 and 3), each of which is mounted on a pair of lugs 190. The forward lugs of the rails are supported by and engage with the threaded portion of a horizontal spindle 192 while the backward lugs of said rails are supported by and engage with the threaded portion of a spindle 194. Both spindles 192 and 194 are rotatably supported in suitable bearings provided in bottom frame 176. To one end of each spindle is secured a sprocket 196. The sprockets are interconnected by means of an endless chain 198 (FIG. 3) while the spindle 192 also carries a handwheel 200. Each spindle 192 and 194 is provided with a right-hand threaded portion and a left-hand threaded portion and the bottom rails 188 are so arranged that the lugs 190 of the left side rail engage with the left-hand threaded portions of both spindles while the lugs 190 of the right side rails engage with the right-hand threaded portions of both spindles. By turning the handwheel 200 the bottom rails 188 may be brought closer together or further apart to provide proper guidance for the particular size of pans to be used in the machine.

As illustrated in FIGS. 4 and 5 the roller platform E is of sufficient length to accommodate three stacks of pans so that after the last pan of the stack S is lifted from the platform a new stack S1 can be pushed into place without the necessity of stopping the machine.

An alarm or call system is provided to signal an attendant when there are only four or five pans left on the platforms so that he can stand by and push in a new stack after the last pan from the previous one is lifted. The alarm or signal system consists of a suitable switch 202 which is provided with a spring loaded actuating member 204 which engages with the rear edges of the pans close to the bottom portion of the stack S (FIGS. 3 and 4). The switch 202 may be connected through a transformer 206 (FIG. 1) to a suitable signal device such as a bell 208 illustrated in FIG. 1. So long as the switch actuating member 204 is depressed by and in engagement with the rear edges of the pans of the stack S, the switch 202 is open, but as soon as the pans are lifted away, the arm 204 swings forward and effects a closing of switch 202 which in turn causes the bell 208 to summon the attendant. The bell 208, of course, may be replaced by a light or any other desirable signal device.

Since the pan loader illustrated in the drawing is chiefly used in bakeries where dough particles and flour dust may gum up the driving mechanism, the two vertical side frames 20 which house the lifting chains and other mechanisms are closed on the inside with suitable plates 210 while the outside of said frames are covered by means of hinged doors 212 to provide ready access for servicing. This arrangement also prevents any grease or oil from the mechanisms to drop or splash on the pan into which food is deposited later on.

Since the automatic pan loader illustrated in the drawing has proven to be a fast and trouble-free pan feeding device, it also has been experienced that its economy and efficiency may be utilized to a greater extent by having additional stacks of pans in readiness for feeding into the machine. For this reason the machine may be provided with a movable and detachable storage and infeed conveyor releasably secured to the free end of the roller platform E. The storage and infeed conveyor F illustrated in FIG. 5 consists of a suitable rectangular frame 220 mounted on four rollers or casters 222.

The frame 220 rotatably supports a row of rollers 224 of the same type as the rollers 172 of the platform E. To the rear of the frame 220 is suitably secured a U-shaped handle bar 226 employed for the purpose of manually pushing or moving the infeed conveyor when detached from the machine.

The front end of the infeed conveyor also loosely carries a stack metering rail which consists of two spaced vertical tubes 228 which at their top end are connected to a horizontal cross tube 230. Adjacent both sides of the extreme forward end of frame 220 are suitably secured two horizontal plates 232 to each of which are mounted three equally spaced upright studs 234, 236 and 238 to any pair of which the lower ends of the vertical tubes 228 may be engaged. Adjacent to the lower end of each of the two vertical tubes 228 is also secured by welding or similar means a short tube or bushing 240 which also may be engaged with any of the three pairs of upright studs 234, 236 and 238. As illustrated in FIG. 5 the stacks of pans carried by the infeed conveyor F are placed fairly closely against each other and are confined between the stationary mounted upright tubes of the handle bar 226 and the vertical tubes 228 of the metering rail, thus preventing tilting or shifting of the stacks of pans while being moved on the auxiliary infeed conveyor. In order to maintain this stack confinement feature when pans of a smaller or larger size are used the vertical tubes 228 or their adjacent smaller tubes 240 may be brought in engagement and placed on any of the three pairs of upright studs 234, 236 and 238 to acquire the correct distance between said vertical tubes and the stationary parts of handle bar 226 to accommodate the size of pans to be used. With the arrangement shown in FIGS. 5, 6 and 7, nine different positions of the vertical tubes 228 may be obtained or stated otherwise through positions on each of the studs 234, 236 or 238. FIG. 7 illustrates in dotted lines how the vertical tubes may be placed on the different upright studs. The arrangement in dotted lines at 238 in FIG. 7 is obtained by reversing side for side the vertical tubes 228.

Since the height of the stacks of pans to be pushed into the pan loader is limited, the horizontal cross tube 230 serves as the metering bar for the height of the stacks to be placed on the movable infeed conveyor so that any guesswork concerning the height of the stacks is eliminated.

In order to properly connect the infeed conveyor F to the end of the roller platform E, the extreme ends of the roller platform rails 174 are provided with a pair of latch hooks 242, FIGS. 3 and 7, which are secured to and extend from the ends of said rails 174. The forward end of the infeed conveyor F is provided with a horizontal latch bar 244 which at each end is secured to a lug 246 which is pivotally attached to the side end portion of frame 220 by means of a bolt 248. A suitable tension spring 250 is employed to keep the latch bar 244 in the raised position illustrated in FIGS. 5 and 7.

In order to connect the movable conveyor F to the end of the roller platform E of the pan loader, the attendant simply pushes the front end of the conveyor F against the end of the platform E and the latch bar 244 due to its yieldable mounting will engage with the latch hooks 242 extending from the rails 174 of the roller platform E. To detach the conveyor F from the pan loader the attendant simply steps on the latch bar 244 and depresses it while moving the conveyor backwards.

The modified pan loader illustrated in FIGS. 19, 20, 21 and 22 is of the pneumatic type and consists of a vertically reciprocating trolley 260 which carries two pairs of suitable rollers 262 which engage with a vertical hollow square post 264. The latter on its top and bottom is provided with a stud shaft 266 and 268 respectively. Stud 266 rotatably engages with a suitable bearing plate 270 secured to the upper part of a suitable bridge frame 272. The stud 268 on the lower end of post 264 rotatably engages with a suitable bearing 274 (FIG. 19).

To the free end of the stud shaft 266 on the upper end of the post 264 is secured an arm 276 the free end of which is pivotally connected to the end of a piston rod 278 which carries a piston 280 (FIG. 22) engaging with a closed horizontal cylinder 282. Cylinder 282 is provided at one end with a lug 284 which engages with a vertical stud 286 held by a suitable bracket 288 secured to the top portion of the bridge frame 272. Each end of the horizontal cylinder 282 is connected to a tube or hose 290 and 292, respectively, both of which in turn are connected to a three-way solenoid operated air valve 294 held by a bracket 296 secured to the bridge frame 272. Air valve 294 is connected to an air supply control panel A (FIG. 21). The solenoid actuated air valve 294 is a conventional type valve, such as the "Electroaire" manufactured by the Bellows Co. of Akron, Ohio.

The trolley 260 is provided with a pair of vertically spaced lugs 298 which yieldingly engage with the free end of a piston rod 300 connected with a piston 302 in a closed vertical cylinder 304. Cylinder 304, by means of a pair of suitable brackets 306 is held by and secured to the vertical post 264 (FIG. 19). The yieldable connection of the free end of the piston rod 300 and the lugs 298 of the trolley consist of a nut 308 at the end of rod 300, a sleeve 312 secured to said rod and a compression spring 310 (FIG. 19) surrounding the end portion of said rod and being confined between the lower lug 298 and the lower end of the sleeve 312.

The weight of the trolley 260 is balanced by means of a counter weight 314 suspended within the hollow post 264 from one end of a cable 316 while the other end of the latter is secured to a cross rod 318 mounted on the trolley 260. The cable 316 is supported by and guided over a pulley 320 pivotally held by a pin 322 in a suitable lug of the wall of the hollow post 264.

The top and bottom ends of the vertical cylinder 304 are connected by a suitable tubing or duct 324 while to the top end of said cylinder is connected and mounted thereto a two way solenoid controlled air valve 326 such as manufactured by the Bellows Co. of Akron, Ohio. Valve 326 by means of hose 328 is connected to an air supply control panel A, such as illustrated in FIG. 21 of the drawings.

The trolley 260 is also provided with a pair of suitable arms 330 to the free end of which is mounted a gripper finger supporting bar 332 to which in turn are adjustably secured a pair of gripper finger carrying members 334 each of which carry a pair of spring mounted gripper fingers 336.

The gripper finger supporting bar 332, the carrying members 334 and the fingers 336 are of the same construction as the bar 72, carrying member 80 and fingers 84 shown in FIGS. 8, 9 and 10 used in the preferred embodiment and described heretofore.

The bar 332 also carries in its central portion a floating spring mounted pan stabilizing plunger 338 and a pair of spaced adjustable mounted pan guide lugs 340.

The pans P are assembled in a stack S (FIG. 19) and the object of the pan loader is to transfer said pans one by one from the stack S onto the belts 342 of a continuously moving conveyor C which may be of the same type and construction as shown and described heretofore in the preferred embodiment of the machine. The stack S is placed on a suitable platform 344 such as illustrated in FIG. 19, which may be the same as E and F in FIGS. 4 and 5.

The operation of the pneumatic pan loader shown in FIGS. 19, 20, 21 and 22 is as follows:

When the piston 302 in the vertical cylinder 304 is driven downward, the trolley 260 carrying the pan gripper assembly, of course, moves downward also until the U-shaped stabilizing members 346 and the gripper fingers 336 come to rest on the pan P on top of the stack S (FIG. 19) much in the same manner as illustrated and described heretofore in the preferred embodiment. Said contact of members 346 and finger 336 naturally causes the arrest of the trolley 260 while the piston 302 and its piston rod 300 have the tendency to go down still further. However, a disc 348 (FIG. 19) mounted on and carried by the piston rod 300 contacts and depresses a micro switch 350 which in turn actuates the solenoid air valve 326 in such a manner as to direct the air stream which pushed against the top of the piston towards the bottom of the cylinder 304 so that the air stream now pushes against the bottom of the piston and thus effecting an upward motion of the piston as well as the trolley and its pan gripping assembly.

As the pan gripping assembly moves upward, the gripper fingers engage with the pan on top of the stack S in the same manner as illustrated and described in the preferred embodiment heretofore. The pan P is lifted until a vertical stud 352 (FIG. 19) carried by the trolley 260 contacts a spring mounted plunger 354 of a micro switch 356 which actuates the air valve 294 (FIG. 22) in such a manner as to direct the air stream through hose 290 to enter the forward end of the horizontal cylinder 282 which in turn causes the piston 280 to move backward to drive its rod 278 and cause a clockwise turning of the arm 276 which since it is mounted on the upper stud 266 of the vertical cylinder 264 effects also a clockwise turning of said trolley carrying post 264 until the rearward edge of arm 276 contacts a micro switch 358 mounted on the bridge frame 272. At the time the arm 276 contacts switch 358 the pan P, due to the turning of the post 264, has been brought over the belts of the conveyor C as illustrated in dotted lines in FIG. 22. Also near the end of this 90° horizontal swing of the pan and the gripping mechanisms carried by the trolley 260, one set of the gripper fingers 336 engaged with their upper ends with a suitable curved bar or rod 360 which caused a depression of said fingers to release the pan to drop onto the belt 342 of the conveyor C. The rod 360 may be suitably secured to a bracket 362 mounted on the inside of the bridge frame 272 straddling the conveyor C.

The contact of the rear edge of arm 276 with the micro switch 358 causes the solenoid actuated air valve 294 to shift in such a manner as to direct the air stream from the front of the piston 280 through hose 292 to the rear of piston 280 to move it forward. The forward motion of the piston and its rod 278 causes the arm 276 to rotate counter clockwise, which in turn effects a counter clockwise movement of the trolley carrying post 264 until the forward edge of said arm 276 contacts a micro switch 364 (FIG. 22) which takes place just when the piston 280 in the horizontal cylinder reaches the end of its forward stroke and the pan gripping mechanism carried by the arms 330 of the trolley 260 is directly above the pan stack S. The length of the stroke of the piston 280 forward as well as backward is so calculated as to effect an approximate 90° turn of the trolley carrying post 264.

When the forward edge of arm 276 contacts the micro switch 364 the latter causes the solenoid actuated air valve 326 on top of the vertical cylinder 304 to shift in such a manner as to permit the air stream to press against the top of the piston 302 causing it to move downward which, of course, effects a downward movement of the gripper carrying trolley until the gripper fingers contact the top pan of the stack S and arrest said trolley. In this position as mentioned heretofore the micro switch 350 on the trolley (FIG. 19) is closed by the disc 348 on the piston rod 300 causing an upward movement of the piston 302 and consequently of the trolley and gripper mechanism which, of course, have engaged with and lifted the top pan of the stack S, thus repeating the cycle of operation.

In order to avoid the delivery of a pan to the conveyor C before the previous one has been moved out of the way a spring mounted feeler finger 366 of the same type and construction as feeler 144 shown in FIGS. 1 and 18 is located on the conveyor C between the belts 342 projecting into the path of the pans advanced by the same. Said feeler 366 (FIG. 19) is connected with an arm 368 in such a manner that the latter contacts and opens a normally closed micro switch 370 everytime the feeler 366 is depressed by a pan riding over the same. The micro switch 370 is connected in series with the switch 356 which is depressed when the trolley reaches its uppermost position and which is employed to effect a turning of the trolley carrying post 264 to swing the pan carried by the same over the conveyor C. Therefore, the closing of switch 356 will have no effect when a pan on the conveyor is still over the feeler finger 366 and the normally closed switch 370 is held open. In this case the picked up pan is held over the stack S and all movements stop until the pan on the conveyor rides off the feeler finger 366 and switch 370 is closed again. There is no strain on the mechanism but merely pneumatic pressure on piston 302 which rests at the top of its stroke in cylinder 304.

The solenoid actuated valve 294 controlling the reciprocating action of piston 280 in the horizontal cylinder 282 is of the three way type so that when the main switch (not shown) of the machine is switched to "off," all air pressure in the unit is released. All air supplied from a suitable source (not shown) is piped to the control panel A by means of a tube 371.

The mechanical pan gripper mechanism shown and described above in the preferred as well as the modified embodiment of the automatic pan loader may readily be replaced by magnetic grippers such as illustrated in FIGS. 23, 24 and 25. In this case the gripper finger supporting bar 372 corresponding to the bar 72 in FIG. 8 or bar 332 in FIG. 19 carries a pair of slidably and adjustably mounted brackets 374 to the bottom side of each of which is secured a horseshoe magnet 376. Each bracket 374 also carries a stud shaft 378 which pivotally supports a bell crank shaped ejector arm 380 which consists of a pan stripper finger 382 and an actuating lever 384. A torsion spring 386 surrounding stud shaft 378 and acting against the actuating lever 384 keeps the latter in approximately upright position and the stripper fingers well within the horseshoe concave of the magnet.

As the magnetic gripper fingers are lowered onto the stack of pans the magnets 376 of course pick up the top pan of the stack. As the pan carrying grippers are moved over the conveyor C this actuating finger 384 comes in contact with a pair of curved release plates similar to the ones designated 112 and shown in FIG. 8 or 360 in FIG. 22 which cause said fingers 384 to be depressed. The depression of fingers 384, of course, causes a downward movement of the stripper fingers 382 against the pan P carried by the magnets 376 and effects a disengagement of the pan from said magnets.

FIG. 26 is a modification of a portion of FIG. 19 using magnet grippers instead of finger grippers. It is considered that the details of its operation may be understood from the foregoing.

What is claimed is:

1. A device for picking up the topmost pan from a stack of pans comprising a pair of endless chains each having a vertical run along the side of a stack of pans from which the topmost pan is to be removed, said vertical run extending to the bottom-most pan of the stack, the downward pass of the vertical run of each chain being substantially parallel to the upward pass and said vertical runs being spaced apart a certain distance, means to activate said chains, a support element secured to each of said chains in parallel relation to each other and extending from the chain a distance substantially half said certain distance in a direction to move along the center line between said chains on their vertical parallel runs, a supporting bar having end portions which may be engaged and supported by said support elements, so that said bar may be deposited on the topmost pan contacted during the downward run of the support elements and re-engaged during the upward run, gripping means secured to said support bar and constructed to grip a tray on which said support bar has rested whereby said support elements may deposit said support bar on a stack of pans during the downward run and lift the topmost tray on engagement during the upward run of said support elements, said gripping means comprising a magnet secured to said bar to engage and support in its magnetic field a topmost pan on the stack on which said bar was deposited.

2. A device substantially as set forth in claim 1 further characterized by a stationary plate positioned at a point distant along the run of said chain from said stack of pans to engage and release a pan supported by said magnets in transit along said chains on said supporting bar to deposit said pan at said position.

3. A device for lifting the topmost pan from a stack of pans at an input station and depositing one by one at a delivery station, said device comprising a support bar having gripping means secured thereto, said gripping means having portions adapted to rest on a pan, mechanisms for moving said support bar from said delivery station to a position in which said gripping means rests on the top pan in said stack at said input station, means to inactivate said mechanisms when said gripping means on said support bar grips the topmost pan of a stack on which said portions have rested, drive means for said mechanisms, said mechanisms lifting said support bar from said stack and moving said support bar and the pan gripped by said pan gripping means to said delivery station, a release device operative to release said pan from said gripping means at said delivery station, said mechanisms comprising a vertical shaft, a slide supporting said support bar and vertically slidable on said vertical shaft, first pneumatic means to lift said slide and other pneumatic means to rotate said vertical shaft, said first pneumatic means to drop said vertical slide until said portions rest on the topmost pan of a stack of pans and control means then actuating said first pneumatic means to lift said slide to a predetermined position on said vertical shaft, said other pneumatic means responsive to the attainment of said position to then rotate said vertical shaft about its axis to rotate said slide therewith and said support bar to the delivery station.

4. A device as set forth in claim 3 further characterized in that said vertical slide is nonrotatably mounted on said vertical shaft.

5. A device for transferring pans one by one from a stack of pans at an input station to an output station, said device comprising a rotatably mounted vertical shaft, a slide slidably mounted on said vertical shaft to move therealong, said slide being secured against rotation about said vertical shaft, a cylinder secured on said vertical shaft and adjacent one end thereof and parallel thereto, a piston slidable in said cylinder, a piston rod secured at one end to said piston and at its other end to said slide, a source of fluid under pressure, valvular means communicating with said cylinder and said source to introduce fluid under pressure to one end of said cylinder and to introduce fluid under pressure to the other end of said cylinder so that said piston may be driven up and down in said cylinder, a second fluid piston cylinder, means interconnecting said second cylinder and said shaft operatively constructed to rotate said shaft through an angular arc, a support bar extending substantially horizontally from said slide, pan gripping means on said support bar to grip a pan when said support bar is lowered so that said first-named fluid cylinder may drop said gripping means on the top of a stack of pans and lift said gripping means, and control means responsive to the lifting of said slide to actuate said second-named fluid cylinder so as to rotate said slide so the pans may be deposited at said output station.

6. A support for a stack of baking pans to be transferred one by one to a station remote from said support, traveling means having a magnet for engaging a selected pan for transfer to said station, a first vertically reciprocable pneumatic operating means and a second horizontally rotatable pneumatic operating means for said traveling means, means operative in response to the downward movement of said first pneumatic means and the engagement of said magnet with a selected pan for interrupting the travel of said traveling means, means operative incident to said interruption for actuating said first pneumatic means to lift said traveling means and said magnet carrying said pan, and means responsive to said lifting for actuating said second pneumatic means, to rotate said traveling means into a position over said station.

References Cited by the Examiner

UNITED STATES PATENTS

| | | | |
|---|---|---|---|
| 1,508,084 | 9/24 | Collis | 33—126.75 |
| 2,524,846 | 10/50 | Socke et al. | 53—247 X |
| 2,615,745 | 10/52 | Fischer. | |
| 2,656,060 | 10/53 | Fischer et al. | 214—309 |
| 2,815,874 | 12/57 | Kowal | 221—106 X |
| 2,881,929 | 4/59 | Giffin. | |
| 2,980,265 | 4/61 | Johnson et al. | |
| 3,031,906 | 5/62 | Holman. | |
| 3,058,614 | 10/62 | Marasso | 221—218 X |

LOUIS J. DEMBO, *Primary Examiner.*

HADD S. LANE, *Examiner.*